United States Patent
Kumar et al.

(10) Patent No.: US 11,537,431 B1
(45) Date of Patent: Dec. 27, 2022

(54) TASK CONTENTION REDUCTION VIA POLICY-BASED SELECTION

(71) Applicant: Amazon Technologies, Inc., Seattle, WA (US)

(72) Inventors: Sandeep Kumar, Sammamish, WA (US); Anirudha Singh Bhadoriya, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 534 days.

(21) Appl. No.: 15/791,062

(22) Filed: Oct. 23, 2017

(51) Int. Cl.
*G06F 9/50* (2006.01)
*G06F 9/48* (2006.01)

(52) U.S. Cl.
CPC .............. *G06F 9/50* (2013.01); *G06F 9/4881* (2013.01)

(58) Field of Classification Search
None
See application file for complete search history.

(56) References Cited

U.S. PATENT DOCUMENTS

| | | | |
|---|---|---|---|
| 9,009,726 | B2 | 4/2015 | Burckhardt et al. |
| 10,169,728 | B1 * | 1/2019 | Konerding ............... G06F 9/452 |
| 2005/0240924 | A1 * | 10/2005 | Jones .................... G06F 9/4881 |
| | | | 718/100 |
| 2011/0161943 | A1 * | 6/2011 | Bellows ................ G06F 9/5066 |
| | | | 717/149 |
| 2014/0223095 | A1 * | 8/2014 | Storm ...................... G06F 3/067 |
| | | | 711/114 |
| 2016/0041906 | A1 * | 2/2016 | Mukherjee ............ G06F 16/221 |
| | | | 711/119 |
| 2018/0089324 | A1 * | 3/2018 | Pal ........................ G06F 9/5011 |

OTHER PUBLICATIONS

IBM Knowledge Center "Pessimistic vs. Optimistic concurrency control", downloaded Oct. 11, 2017 from https://www.ibm.com/support/knowledgecenter/en/SSPK3V_6.5.0/com.ibm.swg.im.soliddb.sql.doc/doc/pessimistic.vs.optimistic.concurrency.control.html, pp. 1-5.

* cited by examiner

*Primary Examiner* — Lewis A Bullock, Jr.
*Assistant Examiner* — Melissa A Headly
(74) *Attorney, Agent, or Firm* — Robert C. Kowert; Kowert, Hood, Munyon, Rankin & Goetzel, P.C.

(57) ABSTRACT

A system implements task contention reduction via policy-based selection. Tasks waiting to be performed are indexed in a task data structure that groups the tasks based on the resources to which the tasks pertain. Workers request batches of tasks for the workers to perform. A scan cycle includes building multiple batches of tasks by scanning the task data structure for a requesting worker. A policy (e.g., random or some other form of optimization) determines where the scan cycle starts in the data structure. Each batch of tasks is delivered to a worker along with a token that keeps the state of the scan cycle (e.g., where the scan cycle started, and where the next scan to build the next batch within the scan cycle begins). The worker returns the token with the next request for the next batch and the next batch is built based on the token's state information.

20 Claims, 8 Drawing Sheets

TASK CONTENTION REDUCTION VIA POLICY-BASED SELECTION

BACKGROUND

Compute activities, such as time-consuming compute activities are sometimes performed via asynchronous processing schemes. In an example, but not necessarily limited to, distributed systems, processing (e.g., asynchronous processing) of compute activities can be performed using two approaches: pessimistic locking or optimistic concurrency control.

The pessimistic locking technique includes an entity placing an exclusive lock on a record to prevent other entities from manipulating the record while the entity updates the record. Generally, such a technique locks out the other users for a relatively longer period of time, slowing the overall system response and causing frustration on the consumer end.

On the other hand, the optimistic concurrency control technique generally allows multiple concurrent entities to access the record while the system keeps a copy of the initial record. For an update, the copy of the initial record is compared to the update to verify changes made to the record since the copy was made. A discrepancy between the copy and the actual record violates concurrency and the update is disregarded; the update process is performed again, starting with a new copy of the record. This technique generally improves performance because the amount of locking time is reduced, thereby reducing the load; however, update failures sometimes reach an unacceptable level (e.g., under relatively higher volumes of update requests), again slowing the overall system response and causing frustration on the consumer end.

DETAILED DESCRIPTION

Various embodiments of task contention reduction via policy-based selection of tasks from a task data structure organized according to a task key space are disclosed. Generally, a task service receives and indexes tasks for a computer system in a task data structure. The tasks may be identified within the task data structure according to a task key value of a task key space. In at least some embodiments, tasks are grouped within the task data structure based on a task key space that organizes the resources to which the tasks pertain.

The tasks are then selected, grouped into batches and sent to workers that perform the tasks. Some task selection techniques cause contention between workers that perform the tasks because the same task may be selected more than once for distinct batches. Embodiments improve upon prior task selection techniques by reducing contention for task processing. Contention may be reduced by selecting tasks for a worker to process based upon techniques specified in a policy, instead of selecting tasks in a fixed manner, for example. A non-exhaustive list of example techniques for selecting a starting location in the task data structure, and that may be specified in the policy include selecting a starting point randomly, based on a heat map, or based on avoiding a particular range in the task data structure.

In embodiments, workers that are available to perform tasks request batches of tasks to perform. The batches may be generated by selecting tasks from a task data structure that indexes the tasks that are to be processed. In some systems (e.g., a system that implements an optimistic concurrency control technique), if entries for the batches for multiple workers are selected near in time, there is potential for multiple workers to be processing batches that include the same task. The workers receive respective batches (some batches including a task that is also in another worker's batch) and begin processing the tasks. With such a technique, different workers may end up working on the same task or set of tasks at the same time, which is an inefficient use of resources.

In some embodiments, in an effort to reduce the likelihood of multiple workers processing the same task or tasks, a system may start the selection of tasks from the task data structure from other than a fixed starting point. The starting point for selecting the tasks may be determined using any number of different optimization techniques. Random or pseudorandom selection, selection based on a heat-map based technique utilizing a heat map corresponding to a workload at the plurality of cells, or based on an availability based technique that utilizes availability information for the plurality of cells, or a scheme that avoids a range of the task data structure (e.g., temporarily unavailable tasks, temporary fault tolerance) are just a few example techniques. The particular starting point may be determined based upon an optimization technique specified in a policy that is implemented by the task service, in embodiments.

In embodiments, a set of requests from a worker may be associated with a scan cycle that includes several rounds of (a) a request for tasks from the worker, and (b) a response from a task service that includes the tasks for the worker to perform. The policy specifies a technique for determining where to start the scan cycle in the data structure, in embodiments. In embodiments, the technique specified in the policy is not applied in between the several rounds of (a) a request for tasks from the worker, and (b) a response from a task service, of a scan cycle for a worker. The specified technique may be applied only to the initial start of the scan cycle, in embodiments. However, it is contemplated that a technique specified in the policy may be applied to determine where to start selection of tasks for one or more rounds of (a) a request for tasks from the worker, and (b) a response from a task service of a scan cycle for a worker, in some embodiments.

Various components of FIG. 1 may perform some of the steps illustrated in the processes depicted in FIGS. 2-5 and described below. As an example, task service 102 may perform steps illustrated in FIGS. 2-4 and workers 132a-n may perform the steps in FIG. 5. The steps depicted in FIGS. 2-5 and described below may be performed by other components, in embodiments.

Figure 1:
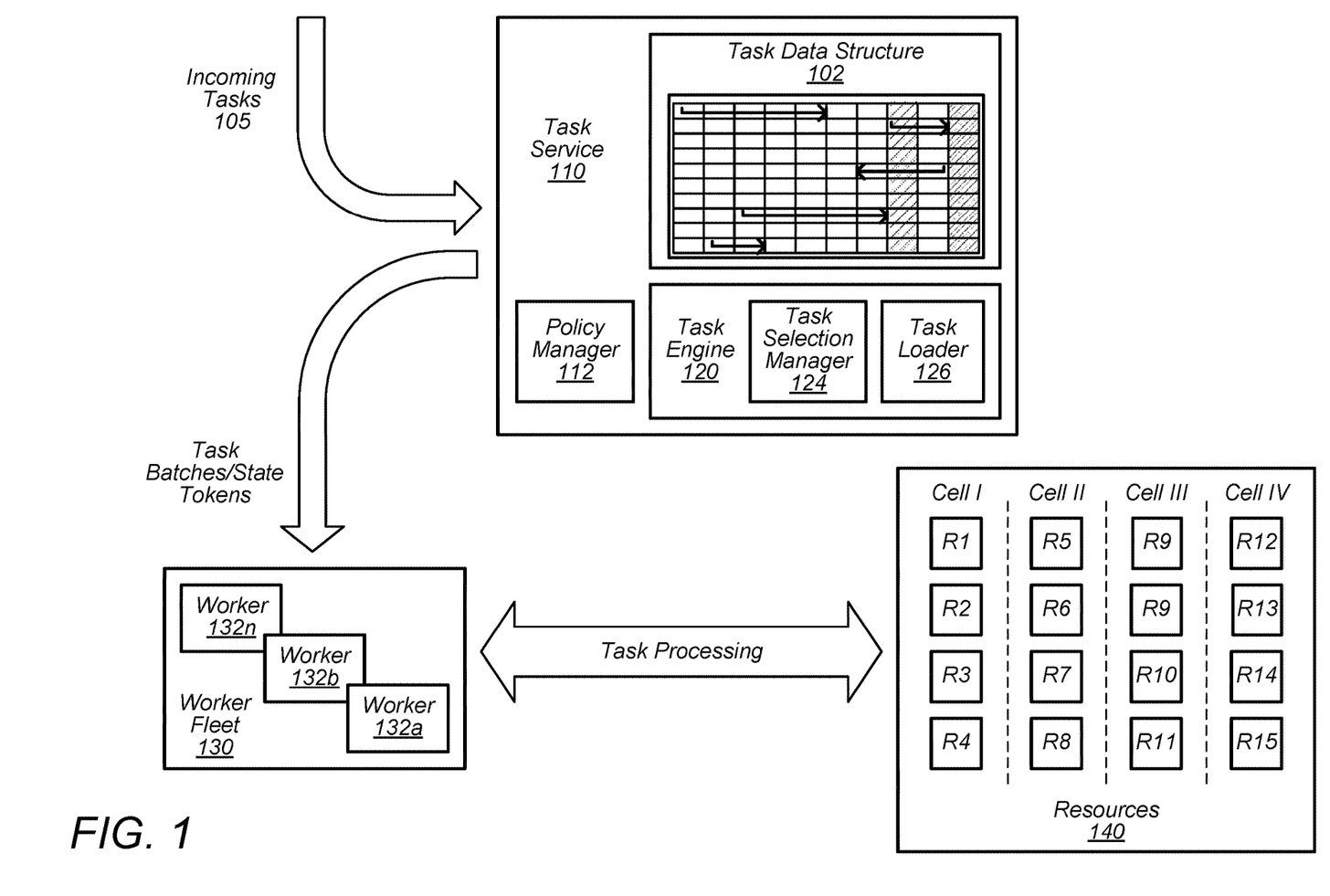
FIG. 1 illustrates a system that includes a task service, worker fleet and resources of a service that implements task contention reduction via policy-based selection, according to at least some embodiments.

FIG. 1 illustrates a system that includes a task service, worker fleet and resources of a service that implements task contention reduction via policy-based selection, according to at least some embodiments. Generally, the system receives, aggregates, organizes and distributes computer tasks among a fleet of workers. Although some embodiments are depicted within the context of a storage service of a multi-tenant service provider network, the techniques disclosed herein may be equally applicable to other systems in other contexts.

Figure 2:
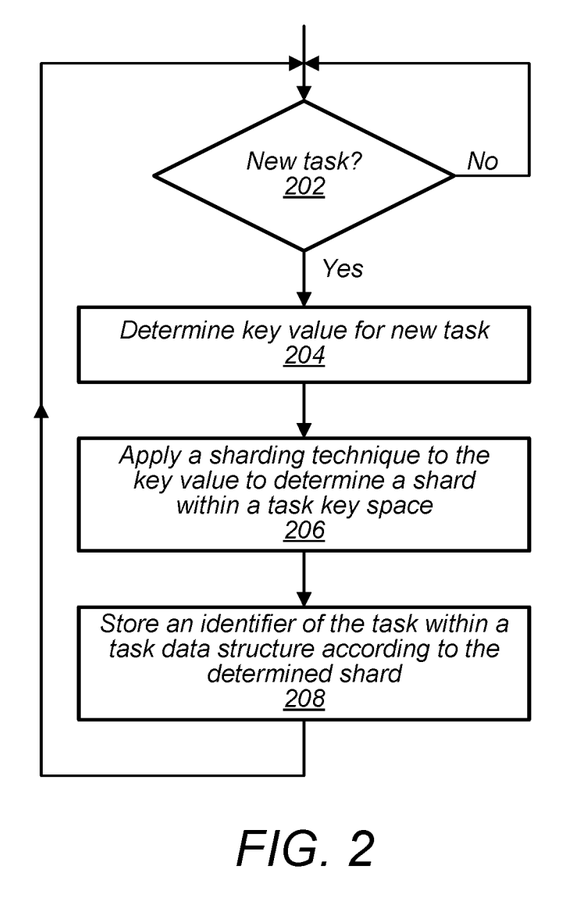
FIG. 2 is a flow chart illustrating a technique for indexing incoming tasks into a key space as part of task contention reduction via policy-based selection, according to at least some embodiments.

Generally, the task service 110 receives new incoming tasks 105, and indexes the received tasks in a key space defined by a task data structure 102. For example, task loader 126 may obtain the incoming tasks 105, apply a technique to determine where to index the task in the task data structure 102, and store an indication of the task in the task data structure. A particular incoming task storage technique is illustrated in FIG. 2, for example.

In embodiments, tasks may be identified within the task data structure 102 according to a task key value of a task key space and the tasks are grouped within the task data structure based on the resources to which the tasks pertain. For example, the task key space may be organized into shards and the shards may correspond to resources (e.g., groups of resources or cells) to which the tasks pertain. The groups of resources in a cell may be related, in embodiments.

Figure 3:
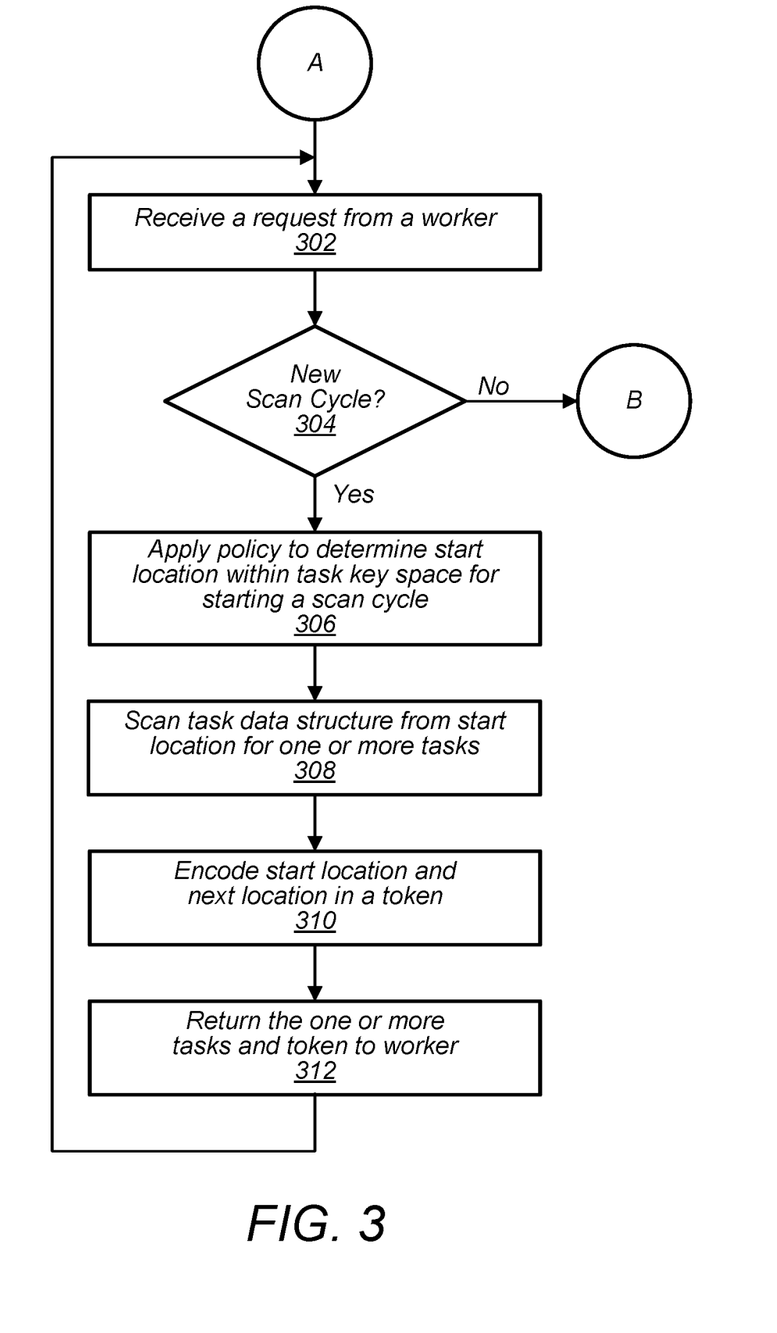
FIG. 3 is a flow chart illustrating a technique of policy-based selection of tasks from a key space that reduces contention of task processing among workers, according to one embodiment.
Figure 4:
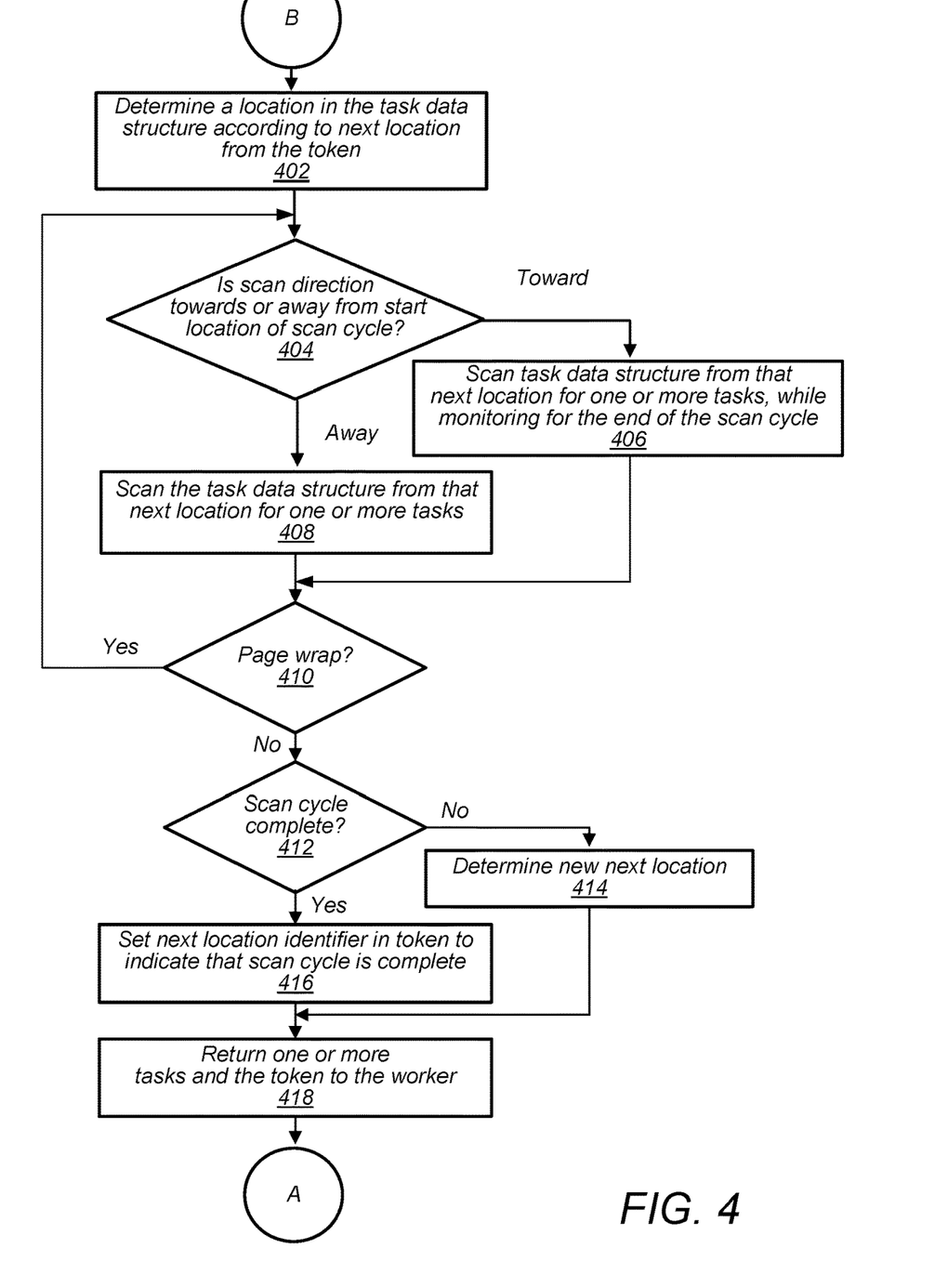
FIG. 4 is a flow chart illustrating a technique for selection of tasks that reduces contention of task processing among workers, according to one embodiment.
Figure 6:
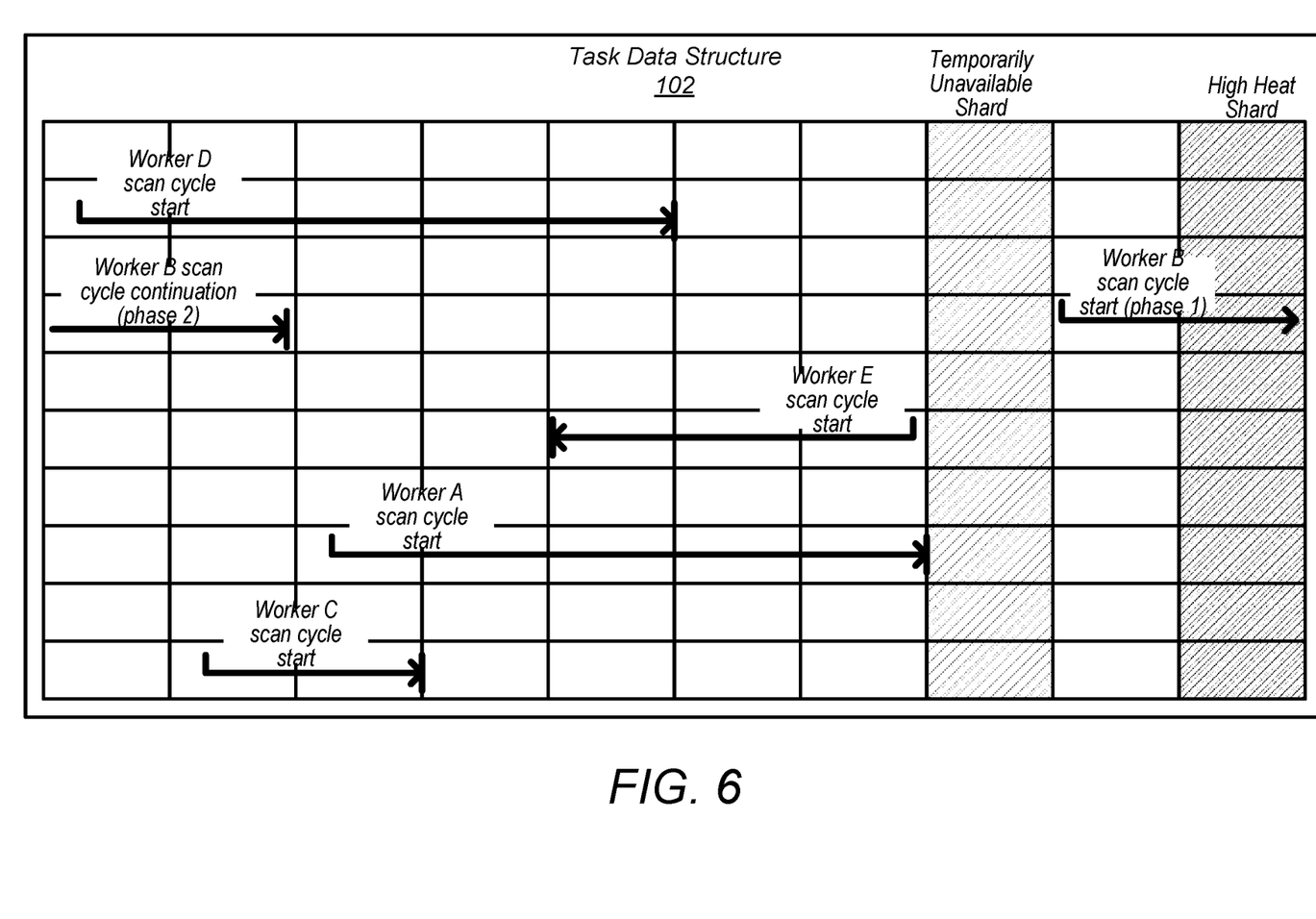
FIG. 6 depicts an example implementation of a task key space, according to at least some embodiments.

Task selection manager 124 responds to a request from a worker 132 for tasks by building batches of one or more tasks from the task data structure 102. Generally, task selection manager 124 determines a starting point in the task data structure 102 for selecting tasks based on a policy, scans from the starting point until the batch is complete, and then sends the batch to the requesting worker. A token that maintains state associated with the selection from the task data structure 102 is included along with the batch sent to the worker, in embodiments. An example selection process is depicted in FIGS. 3-4. Among other features, FIG. 6 illustrates that selections of tasks from the task data structure may be performed in parallel for multiple distinct workers.

Policy manager 112 may include an interface for configuring the policy. For instance, policy manager 112 may include a graphical user interface or application programming interface for making configuration changes to the policy. For example, an administrator may use the policy manager 112 to change the starting selection technique specified in the policy from a random based policy to an availability based policy. Other policy management features may be implemented by the policy manager, such as policy creation, starting point selection technique additions, changes or deletions, etc. The policy manager 112 may maintain a heat map of the key space, availability information, and/or faults in the key space, in embodiments.

Workers process the batches of tasks. In some embodiments, due to the organization of the task data structure 102 into shards based upon the resources 140 that pertain to the tasks, the resources involved with a worker processing the tasks of the batch are limited to a set of resources (e.g., limited to a set of resources R1-R4 in cell I). Such organization may increase system efficiency, in embodiments.

FIG. 2 is a flow chart illustrating a technique for indexing incoming tasks into a key space as part of task contention reduction via policy-based selection, according to at least some embodiments. The depicted steps may be performed by components of task service 110, such as by the task loader, 126, in embodiments.

Diamond 202 illustrates that the process waits for a new task to be received. If no new tasks are received [no], the illustrated process waits until a new task is received. If a new task is received [yes], a key value for the task is determined (block 204). For example, a key value may have been provided with the task, or a key value may be determined based on characteristics of the request or based upon metadata associated with the new task. Although other techniques are contemplated for some systems, in at least the illustrated embodiment, a sharding technique is applied to the key value to determine a shard within the key space (block 206). For example, the key value may be hashed to determine the shard. An identifier of the task is stored within the determined shard of the task data structure that implements the key space (block 208). For example, the task loader 126 stores a key that identifies a task in a shard of task key space.

FIG. 3 is a flow chart illustrating a technique of policy-based selection of tasks from a key space that reduces contention of task processing among workers, according to one embodiment. FIG. 4 is a related flow chart illustrating a technique for selection of tasks that reduces contention of task processing among workers, according to one embodiment. Circles A and B are used to depict links between FIGS. 3 and 4. For instance, FIG. 3 illustrates that a negative decision at 304 goes to B in FIG. 4 and FIG. 4 illustrates that after 412, the next step is to go to A in FIG. 3. In some embodiments, some of the steps in FIGS. 3 and 4 are performed by a control system.

Requests are received from a worker (block 302), from one of the workers 132 in FIG. 1, for example. A determination is made whether the request is a request for a new scan cycle (block 304). For instance, for a request that includes a token, if the token indicates a next selection, this is not a new scan cycle request. But, if the token does not indicate a next selection (e.g., for new workers that do not yet have a token), or if the token is empty or zeroed (e.g., for workers that have completed a scan cycle) a new scan cycle is initiated [yes]. A policy is applied to determine a start location within the task key space for starting a scan cycle (block 306). For example, the policy may specify a random or pseudo-random technique for determining the start location or the policy may specify some other technique (e.g., a heat-map based technique, or an availability based technique) to determine the start location within the task key space.

In embodiments, the technique specified by the policy (e.g., random, heat-based, availability-based) does not take the relationship between the shards and cells into account when determining a start location for a task scan cycle. A task scan cycle may include a number of distinct selections of batches of tasks, in embodiments.

In embodiments, a heat-map based technique may select a start location based on areas of the key space that are associated with high workload shards. In another example, an availability based technique may avoid ranges of the key space that are unavailable (e.g., due to faults in the key space) or a temporarily unavailable (e.g., when a resource range is sharded and handled by small cells of resources). Other techniques are contemplated.

The task data structure is scanned from the determined start location for one or more tasks (block 308) to build a batch of one or more tasks and the start location as well as a next location is encoded (block 310) in a token that corresponds to the batch of one or more tasks. The next location that is identified in the token is the next location in the task data structure that the scan will continue with when the next request in the scan cycle is received, in embodiments. In embodiments, the next location changes for every request from the worker until the cycle scan completes or until all tasks are selected. The one or more tasks and the token are returned to the worker. FIG. 3 illustrates that the process repeats back to block 302, where a request from a worker is received.

As noted above, FIG. 3 illustrates that if the request is not for a new scan cycle (e.g., if the request is for an already-existing scan cycle, indicated by receiving a token with a next location identifier) the process goes to circle B, which is depicted at the start of FIG. 4. A location in the task data structure is determined according to the next location identified in the token (block 402). For instance, the next location identified in the token may have been the next location to be scanned when the prior scan for the prior request of the scan cycle reached a batch limit threshold that marked the end of building that batch of tasks.

In some embodiments, the scanning may have two phases. For example, in a first phase, scanning proceeds in a direction moving away from the scanning start location. FIG. 6, described below, illustrates phase 1 at "Worker B scan cycle start (phase 1). During the first phase of scanning it may not be necessary to check whether the scanning has come to the end of the scanning cycle (the end of the cycle is the task just before getting back to the scan cycle starting location, in embodiments) because the scanning is moving away from the starting location. In a second phase (e.g., when the scanning has wrapped around a page), scanning proceeds in a direction moving back toward the scanning start location. FIG. 6 illustrates phase 2 at "Worker B scan cycle continuation (phase 2)." During this phase, it may be necessary to check whether the next scanned location is the end of the scan cycle or not before scanning the next location (e.g., so that tasks that have already been scanned are not rescanned in the same scan cycle). By tracking the phase of the scanning, it may be possible to reduce the number of computations required to generate a batch of tasks. For example, during phase 1 scanning computational load is reduced because it is not necessary to monitor for the end of the scan cycle, in embodiments.

In FIG. 4, diamond 404 illustrates that a determination is made whether the scan direction is towards or away from the start location of the scan cycle. If the scan direction is towards the start location (404, toward), the task selection manager scans that task data structure from that next location for one or more tasks while monitoring for the end of the scan cycle (block 406).

If the scan direction is away from the start location of the scan cycle (404, away) the task data structure is scanned from that next location for one or more tasks (block 408). Block 410 illustrates that the system may identify a page wrap. If a page wrap is encountered (410, yes) the system continues scanning through the page wrap (e.g., Worker B scan cycle in FIG. 6 illustrates a page wrap) the process returns to diamond 404, where it is determined whether the scan direction is towards or away from the start location of the scan cycle. If a page wrap is not encountered during scanning (410, no) a determination whether the scan cycle is complete is made (diamond 412). If no, a new next location is determined (block 414). If yes, the next location identifier in the token is set to indicate that the scan cycle is complete (block 416). In either case, the one or more tasks and the token are returned to the work (block 418). FIG. 4 illustrates that the process then returns to circle A, back in FIG. 3, and so on.

Figure 5:
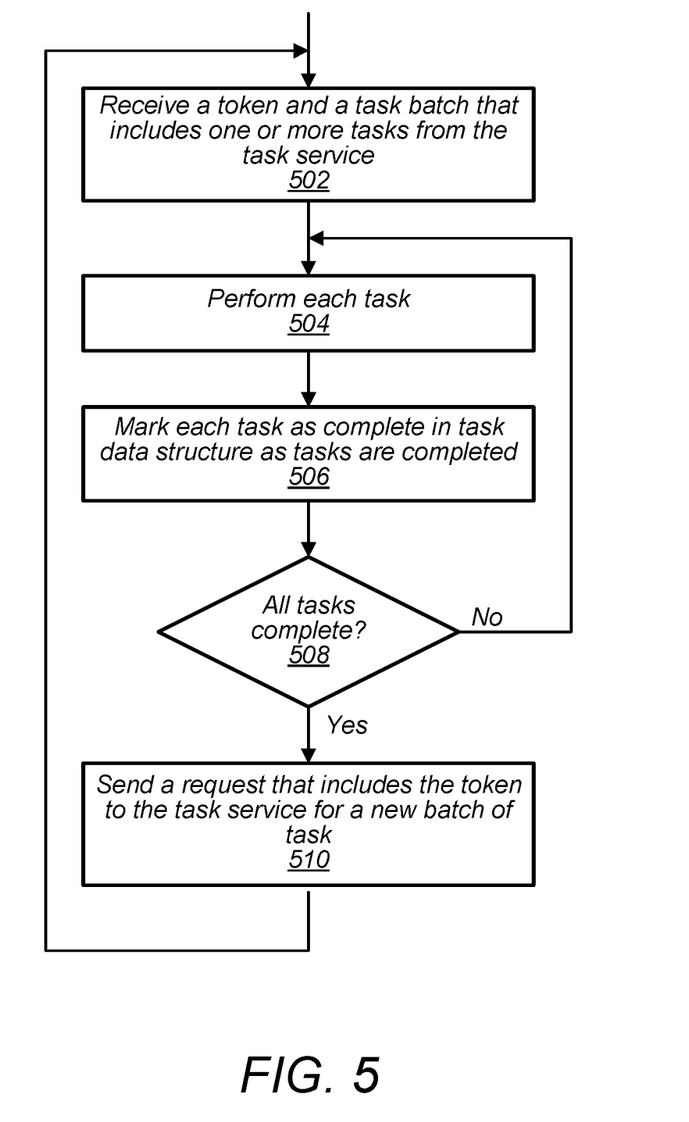
FIG. 5 is a flow chart illustrating a technique for worker performance of tasks that reduces contention of task processing among workers, according to one embodiment.

FIG. 5 is a flow chart illustrating a technique for worker performance of tasks that reduces contention of task processing among workers, according to one embodiment. The process depicted in FIG. 5 may be performed by workers (e.g., workers 132a-n). A token and a task batch that includes one or more tasks is received (block 502). Each of the tasks are performed (block 504). In some embodiments, the tasks include create snapshot tasks, delete snapshot tasks, copy snapshot tasks, view snapshot tasks, or share snapshot tasks. Although any of various other tasks are contemplated, such as, but not limited to virtual instance instantiation requests, resource management requests, customer data manipulation requests, or data volume management requests.

Each task is marked complete in the task data structure as the tasks are completed (block 506). The performance of the tasks continues (all tasks complete?—no) until all tasks are completed (all tasks complete?—yes) and a request that includes the token is sent to the task service for a new batch of one or more tasks (block 510).

FIG. 6 depicts an example implementation of a task key space, according to at least some embodiments. The task data structure 102 is organized according to the key space, in embodiments. FIG. 6 depicts that selections of tasks for distinct workers may be performed concurrently, and that shards of the task data structure 102 may be associated with heat-based selection criteria (e.g., High Heat Shards) or availability-based criteria (e.g., Temporarily Unavailable Shard). For instance, FIG. 6 illustrates Worker A scan cycle start in the third to last row of the illustrated task data structure 102 that starts on the left and is proceeding to the right through various iterations of a scan cycle associated with Worker A (e.g., one of the workers 132a-n). Worker E Scan cycle start is illustrated in the sixth row of the task data structure 102 and illustrates that scans may scan right to left as well as the left to right scan illustrated for Worker A scan cycle.

In embodiments, a token may include a starting point (e.g., the first resource id selected for a scan cycle based on the policy), a next resource (e.g., identifies the end of the prior scan, or the starting point for the next batch), and/or a direction of selection (e.g., from left to right or from right to left).

The last column (shaded) of task data structure 102 illustrate that shards of the task data structure may be designated as high heat shards, and the third to last column of the illustrated task data structure 102 illustrate that shards may be designated as temporarily unavailable.

Worker B scan cycle start and Worker B scan cycle continuation illustrate that scan cycles may start in different parts of the task data structure and continue around the data structure (e.g., wrapping around a page). The scan cycle may continue in the same row until the starting location is reached, completing the scan cycle for that worker. A task prior to the starting location will be the last resource to be scanned in the scan cycle, in embodiments. The starting location may act as a marker for the end of the scan cycle, in some embodiments.

A new starting location may then be selected (based on the policy) when a subsequent request for tasks is received from that worker. It is notable that task key spaces may be of any size from small to very large, without restriction, in some embodiments. Example key spaces may be large—including millions of tasks, in embodiments.

Figure 7:
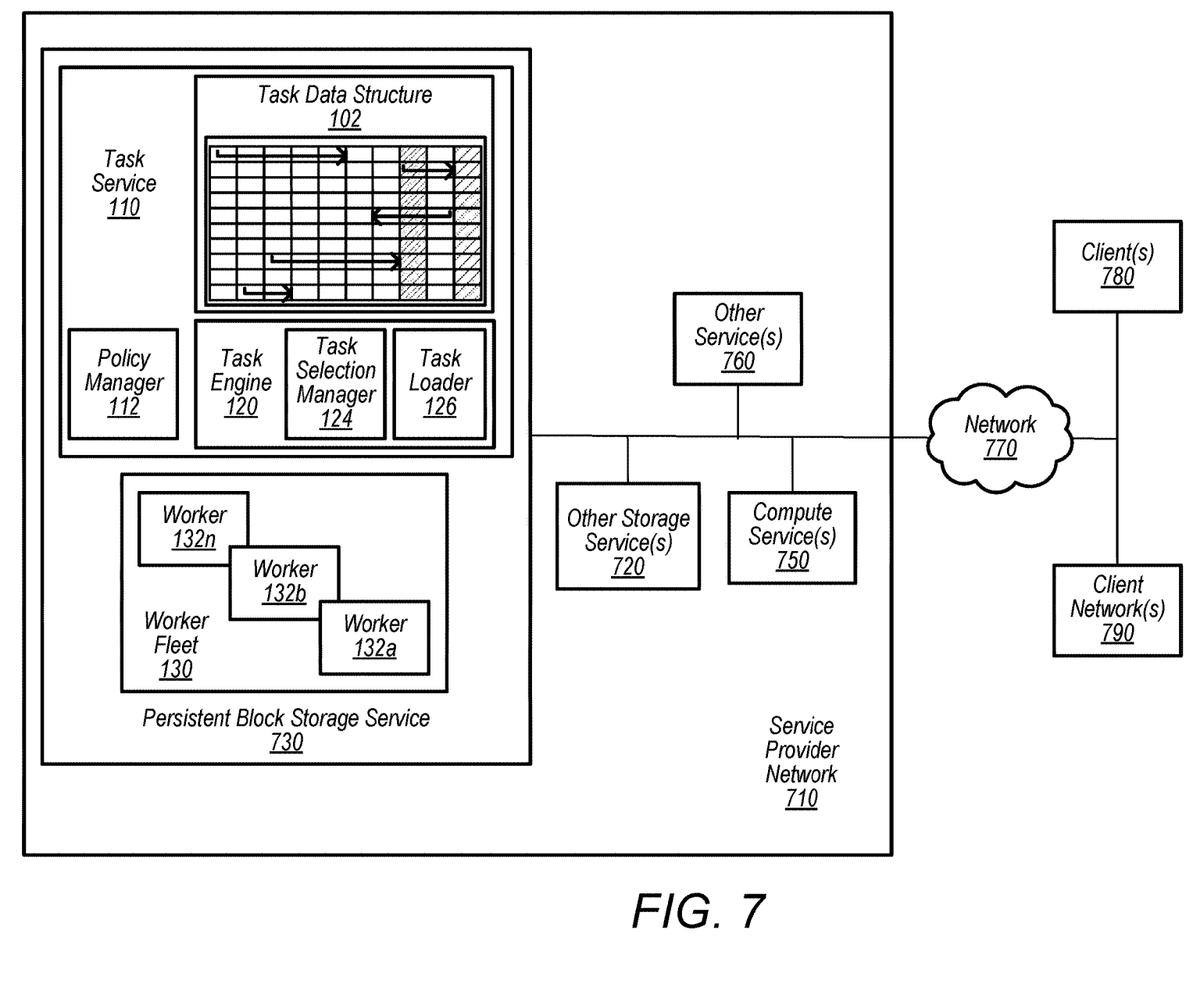
FIG. 7 is a block diagram illustrating an example service provider network that implements task contention reduction via policy-based selection, according to at least some embodiments.

FIG. 7 is a block diagram illustrating an example service provider network that implements task contention reduction via policy-based selection, according to at least some embodiments. A multi-tenant service provider network 710 is illustrated with one or more compute service(s) 750, one or more other service(s) 760, a persistent block storage service 730, and one or more other storage service(s) 720 that provide services to client(s) 780 and/or client network(s) 790 over network 770 (e.g., a private or public network or some combination thereof). FIG. 7 depicts task service 110 and worker fleet 130 as part of a persistent block storage service 730. As described above, persistent block storage service 730 may provide storage services for the other services of the service provider network or for the clients of the service provider network. In at least some embodiments, the persistent block storage service 730 may store snapshots of volumes.

Illustrative System

Figure 8:
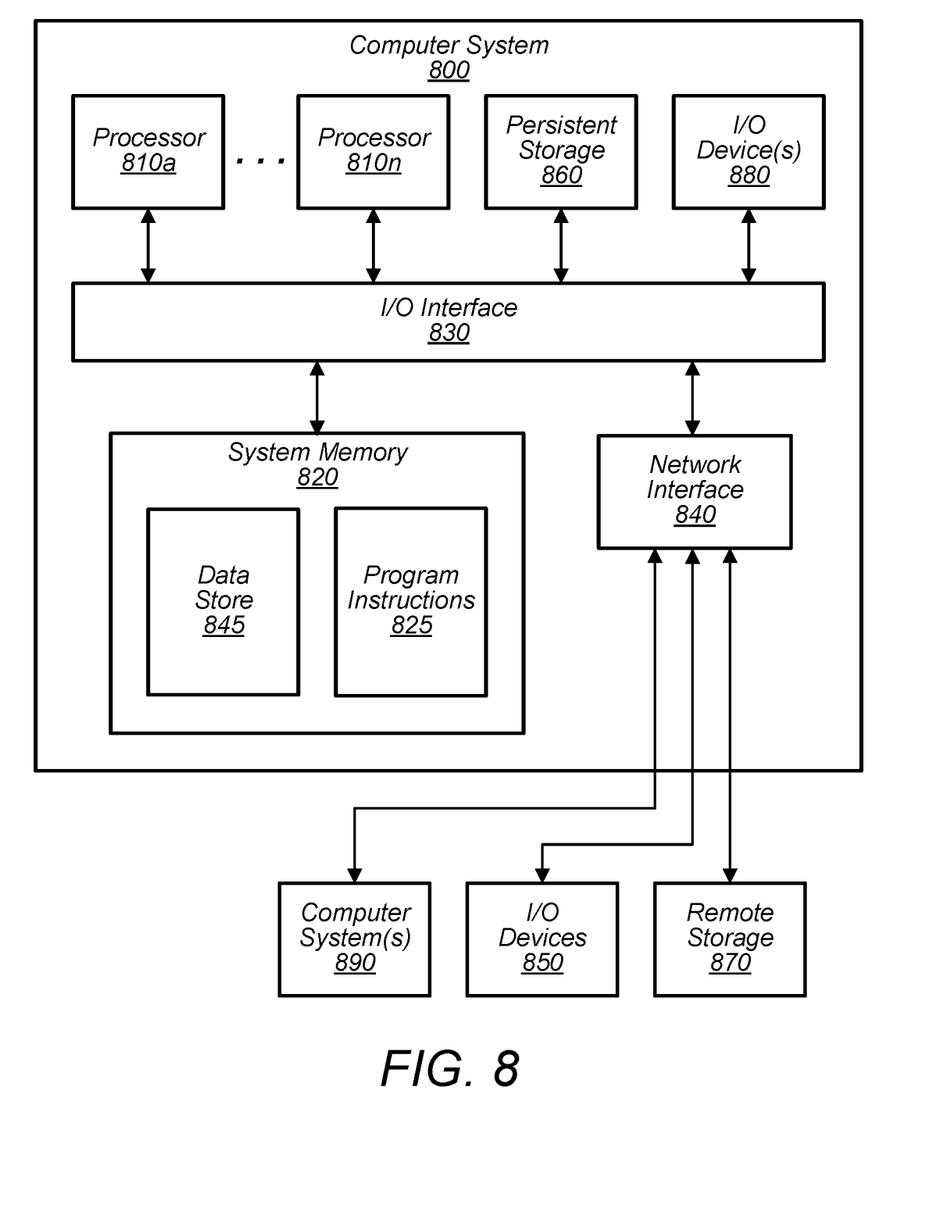
FIG. 8 is a block diagram illustrating a computer system configured to implement at least a portion of a system that includes a task service, worker fleet, and resources, according to various embodiments.

Any of various computer systems may be configured to implement processes associated with a system that implements task contention reduction via policy-based selection. For example, FIG. 8 is a block diagram illustrating one embodiment of a computer system suitable for implementing some or all of the techniques and systems described herein. For example, each of the computer systems may host one or more workers 130, resources 140, task services 110, clients 780, client networks 790 or any of the services 720, 750, 760 of the multi-tenant service provider network 710. In some cases, a host computer system may host multiple virtual instances that implement the workers 130, resources 140, task services 110, clients 780, client networks 790 or any of the services 720, 750, 760 of the multi-tenant service provider network 710. However, the techniques described herein may be executed in any suitable computer environment (e.g., a cloud computing environment, as a network-based service, in an enterprise environment, etc.).

Various of the illustrated embodiments may include one or more computer systems 800 such as that illustrated in FIG. 8 or one or more components of the computer system 800 that function in a same or similar way as described for the computer system 800.

In the illustrated embodiment, computer system 800 includes one or more processors 810 coupled to a system memory 820 via an input/output (I/O) interface 830. Computer system 800 further includes a network interface 840 coupled to I/O interface 830. In some embodiments, computer system 800 may be illustrative of servers implementing service provider logic, enterprise logic or downloadable applications, while in other embodiments servers may include more, fewer, or different elements than computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be embedded processors implementing any of a variety of instruction set architectures (ISAs), such as the x106, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor 810. In various embodiments, system memory 820 may be implemented using any suitable memory technology, such as static random-access memory (SRAM), synchronous dynamic RAM (SDRAM), non-volatile/Flash-type memory, or any other type of memory. In the illustrated embodiment, program instructions and data implementing desired functions, such as those methods and techniques described above for the downloadable software or provider network are shown stored within system memory 820 as program instructions 824. In some embodiments, system memory 820 may include data 825 which may be configured as described herein.

In one embodiment, I/O interface 830 may be configured to coordinate I/O traffic between processor 810, system memory 820 and any peripheral devices in the system, including through network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments, some or all of the functionality of I/O interface 830, such as an interface to system memory 820, may be incorporated directly into processor 810.

Network interface 840 may be configured to allow data to be exchanged between computer system 800 and other devices attached to a network, such as between a client device (e.g., 780) and other computer systems, or among hosts (e.g., hosts of a service provider network 710), for example. In particular, network interface 840 may be configured to allow communication between computer system 800 and/or various other device 860 (e.g., I/O devices). Other devices 860 may include scanning devices, display devices, input devices and/or other communication devices, as described herein. Network interface 840 may commonly support one or more wireless networking protocols (e.g., Wi-Fi/IEEE 802.7, or another wireless networking standard). However, in various embodiments, network interface 840 may support communication via any suitable wired or wireless general data networks, such as other types of Ethernet networks, for example. Additionally, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 800 via I/O interface 830. A computer-readable storage medium may also include any volatile or non-volatile media such as RAM (e.g. SDRAM, DDR SDRAM, RDRAM, SRAM, etc.), ROM, etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

In some embodiments, I/O devices may be relatively simple or "thin" client devices. For example, I/O devices may be configured as dumb terminals with display, data entry and communications capabilities, but otherwise little computational functionality. However, in some embodiments, I/O devices may be computer systems configured similarly to computer system 800, including one or more processors 810 and various other devices (though in some embodiments, a computer system 800 implementing an I/O device 850 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 800. In general, an I/O device (e.g., cursor control device, keyboard, or display(s) may be any device that can communicate with elements of computing system 800.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the task service 110, worker(s) 132a-n, resources or components of the service provider network 710, other various services, data stores, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
a task service implemented via one or more hardware processors and memory, wherein the task service indexes tasks for a distributed system in a task data structure, wherein tasks are identified within the task data structure according to a task key value of a task key space;
a plurality of resources of the distributed system, wherein tasks are grouped within the task data structure based at least in part on one or more of the resources to which the tasks pertain;
a plurality of workers implemented via one or more hardware processors and memory, wherein a respective worker of the plurality of workers:
sends a request to the task service that begins a scan cycle through the task key space;
receives, from the task service, a batch of one or more tasks and a corresponding token, wherein the token includes:
a start location within the task key space that indicates where the scan cycle started, and
a next location in the task key space;
performs the one or more tasks; and
includes the token in a subsequent request to the task service for one or more additional tasks determined from the next location in the task key space;
wherein the task service, responsive to the request to begin the scan through the task key space, applies a policy to determine the start location within the task key space, wherein the task service returns to the worker the batch of one or more tasks and the corresponding token that includes the start location and the next location in the task key space.

2. The system of claim 1, wherein:
the plurality of resources is organized into a plurality of cells, each cell comprising one or more of the plurality of resources,
the task service groups tasks into shards of the task key space,
each shard corresponds to a different cell of the plurality of cells and includes tasks pertaining to resources within that cell; and
the start location is for a shard of the task key space corresponding to a cell of the plurality of cells selected by the task service according to the policy.

3. The system of claim 2, wherein the policy to determine the start location within the task key space includes a random or pseudorandom technique, a heat-map based technique utilizing a heat map corresponding to a workload at the plurality of cells, or an availability based technique utilizing availability information for the plurality of cells.

4. The system of claim 1, wherein the task service, responsive to another subsequent request from the worker:
determines, based at least on the start location from the token, that a scan cycle for the worker has cycled through the task key space; and
applies the policy to determine a new start location within the task key space, the new start location for starting a new scan cycle to return batches of tasks to the worker.

5. A method, comprising:
performing, by a task service implemented via one or more computers:
indexing tasks in a task data structure, wherein tasks are indexed within the task data structure according to a task key value of a task key space, and wherein indexing tasks comprises locating the tasks within the task data structure based at least in part on resources to which the tasks pertain;
receiving a request from a worker to begin a scan cycle for tasks to perform;
applying a policy to determine a start location within the task key space for scanning for tasks;
scanning the task data structure starting from the start location for one or more tasks;
encoding the start location and a next location in the task key space into a token; and
returning the one or more tasks and token to the worker.

6. The method as recited in claim 5, wherein:
said locating tasks comprises grouping the tasks within the task data structure according to shards of the task key space, each shard corresponding to a different cell of a plurality of cells of resources to which the tasks pertain; and
the start location is for a shard of the task key space corresponding to a cell of the plurality of cells selected by the task service according to the policy.

7. The method as recited in claim 6, wherein said grouping the tasks within the task data structure according to shards of the task key space comprises:
applying a sharding technique to the task key values to determine shards within the key space; and
storing the tasks within the task data structure according to the determined shards.

8. The method as recited in claim 5, further comprising:
receiving a subsequent request from the worker for tasks to perform, the subsequent request comprising the token that includes the start location and the next location in the task key space;
continuing the scanning of the task data structure starting from the next location for another one or more tasks;
determining a new next location for the token; and
returning the other one or more tasks and the token encoded with the new next location to the worker.

9. The method as recited in claim 5, further comprising:
receiving a subsequent request from the worker for tasks to perform, the subsequent request comprising the token that includes the start location and the next location in the task key space;
scanning the task data structure starting from the next location for another one or more tasks;
determining that the scan cycle is complete; and
returning the other one or more tasks and the token encoded with an indication of the completed scan cycle to the worker.

10. The method as recited in claim 9, further comprising:
receiving another subsequent request from the worker for tasks to perform, the subsequent request comprising a token that includes the indication of the completed scan cycle;
applying the policy to determine a new start location within the task key space for scanning for tasks;
scanning the task data structure starting from the new start location for one or more tasks;
encoding the token with the new start location and a next location in the task key space; and
returning the one or more tasks and the token to the worker.

11. The method as recited in claim 5, wherein said indexing comprises:

receiving a new task to be indexed into the key space;
determining a key value for the new task;
applying a sharding technique to the key value to determine a shard within the key space; and
storing an indication of the task within the task data structure according to the determined shard.

12. The method as recited in claim 5, wherein said indexing, said receiving, said applying, said scanning, said encoding, and said returning are performed by a control system of a multi-tenant storage service of a provider network that provides storage services to a plurality of distinct clients.

13. The method as recited in claim 5, wherein said scanning the task data structure includes determining that the scan direction is away from the start location, and performing said scanning the task data structure without monitoring for the end of the scan cycle.

14. The method as recited in claim 5, wherein said scanning the task data structure includes determining that the scan direction is towards the start location, and performing said scanning the task data structure while monitoring for the end of the scan cycle.

15. The method as recited in claim 6, wherein said applying the policy to determine the start location within the task key space for scanning for tasks includes applying a technique selected from a random or pseudorandom technique, a heat-map based technique utilizing a heat map corresponding to a workload at the plurality of cells, or an availability based technique utilizing availability information for the plurality of cells.

16. A non-transitory computer readable storage medium storing program instructions that, when executed by a computer, cause the computer to implement a worker to:
receive a batch of tasks and a token comprising a start location within a task key space and a next location in the task key space;
perform each task of the batch of tasks; and
send a subsequent request, including the token, to a task service to perform a scan for one or more additional tasks to perform, wherein the token sent in the subsequent request comprises:
the start location within the task key space, and
the next location in the task key space; and
wherein the subsequent request to the task service is a request for the task service to perform the scan to determine the one or more additional tasks from the next location in the task key space included in the token.

17. The non-transitory computer readable storage medium as in claim 16, wherein the program instructions cause the worker to mark each task as complete in a task data structure as the tasks are completed.

18. The non-transitory computer readable storage medium as in claim 16, wherein:
the tasks comprise create snapshot, delete snapshot, copy snapshot, view snapshot, or share snapshot; and
to perform each task of the batch of tasks, the program instructions cause the worker, for a respective data volume, to: create a snapshot, delete a snapshot, copy a snapshot, view a snapshot, or share a snapshot.

19. The non-transitory computer readable storage medium as in claim 16, wherein the program instructions cause the worker to perform tasks comprising volume management tasks for a multi-tenant storage service of a provider network that provides storage services to a plurality of distinct clients.

20. The non-transitory computer readable storage medium as in claim 16, wherein the program instructions cause the worker to process the tasks according to an optimistic concurrency control that does not place locks on the tasks.

* * * * *